US012776953B2

(12) United States Patent
Mariyappan

(10) Patent No.: US 12,776,953 B2
(45) Date of Patent: Oct. 27, 2026

(54) SYSTEM AND METHOD FOR PERFORMING NEAR REAL-TIME NETWORK INFRASTRUCTURE SYNCHRONIZATION USING CONFIGURATION DIFFERENCES

(71) Applicant: AppViewX, Inc., New York, NY (US)

(72) Inventor: Gopal Mariyappan, Coimbatore (IN)

(73) Assignee: APPVIEWX, INC., New York, NY (US)

( * ) Notice: Subject to any disclaimer, the term of this patent is extended or adjusted under 35 U.S.C. 154(b) by 36 days.

(21) Appl. No.: 19/034,278

(22) Filed: Jan. 22, 2025

(65) Prior Publication Data

US 2025/0240211 A1 Jul. 24, 2025

Related U.S. Application Data

(60) Provisional application No. 63/624,717, filed on Jan. 24, 2024.

(51) Int. Cl.

| | |
|---|---|
| ***G06F 15/177*** | (2006.01) |
| ***G06F 16/23*** | (2019.01) |
| ***H04L 41/0873*** | (2022.01) |
| ***H04L 67/1095*** | (2022.01) |

(52) U.S. Cl.

CPC ...... *H04L 41/0873* (2013.01); *G06F 16/2365* (2019.01); *H04L 67/1095* (2013.01)

(58) Field of Classification Search

CPC ............. H04L 41/0873; H04L 67/1095; H04L 41/0813; H04L 41/082; H04L 41/0853; H04L 41/0866; G06F 16/2365

See application file for complete search history.

(56) References Cited

U.S. PATENT DOCUMENTS

| | | | | |
|---|---|---|---|---|
| 2009/0055477 | A1* | 2/2009 | Flesher | H04L 63/105 709/204 |
| 2018/0359145 | A1* | 12/2018 | Bansal | H04L 67/34 |
| 2019/0052531 | A1* | 2/2019 | Sividia | H04L 41/0895 |
| 2024/0020142 | A1* | 1/2024 | Jindgar | G06N 20/20 |

* cited by examiner

*Primary Examiner* — John B Walsh

(57) ABSTRACT

A system and method for performing near real-time network infrastructure sync using configuration differences is provided. The present invention helps to make the orchestrator in sync with the network infrastructure without much time or resource consumption. A configuration diff is generated to understand the delta between the two configuration files available at different points of time at the object level, and a list of added, deleted and updated objects is derived. Based on the configuration diff, the changes including Addition, Deletion or Modification of new network components are handled facilitating the reduction of load on the database for making the orchestrator up-to-date with the network infrastructure.

15 Claims, 4 Drawing Sheets

SYSTEM AND METHOD FOR PERFORMING NEAR REAL-TIME NETWORK INFRASTRUCTURE SYNCHRONIZATION USING CONFIGURATION DIFFERENCES

BACKGROUND

Technical Field

The embodiments herein generally relate to network management, and more particularly to a system and method for performing near real-time updates from the network infrastructure, with very minimal resource consumption at both the orchestrator as well as the network infrastructure devices.

Description of the Related Art

The role of orchestration platforms to manage various network components is vital in the current complex infrastructure. Keeping the objects/components of the network infrastructure up-to-date at the orchestrator is a challenging, time and resource-consuming activity. The orchestrator platform pulls the configuration from the network infrastructure and parses it to manage the same. Currently, all the solutions are straightforward forward from downloading the configuration file and parsing it to keeping the orchestrator up-to-date with the network infrastructure, irrespective of the volume of changes happening in the network infrastructure. Even if there is a minor change, complete download and parsing is required. Making the orchestrator live by sync-up is time-consuming and the resource utilization for the same is also high. The huge number of network infrastructure devices makes near real-time updates difficult leading to periodic synchronization with longer duration (once a day etc).

The current system involves complete configuration file parsing and updating objects. Here, the time consumption for parsing the entire configuration file is very huge. In the distributed parsing of the configuration file, the time taken for the configuration file parsing is reduced, but with the cost of high resource consumption at both the cert-orchestrator as well as at the network infrastructure devices. In addition, determining the modification with respect to addition or deletion is challenging based on the level of complexity involved in the actual parsing logic at the orchestrator end.

Accordingly, there remains a need for addressing the aforementioned technical drawbacks in existing technologies for performing near real-time network infrastructure synchronization using configuration differences with very minimal resource consumption at both the orchestrator as well as the network infrastructure devices.

SUMMARY OF THE INVENTION

According to the first aspect of the invention, a system for performing near real-time network infrastructure synchronization using configuration differences is provided. The system includes a plurality of network infrastructure devices and a server communicatively connected with the plurality of network infrastructure devices. The server is configured to download a current configuration file from the plurality of network infrastructure devices by analysing syslog information of the plurality of network infrastructure devices, and determining whether there is a change in the network configuration of the plurality of network infrastructure devices based on the analysis of the syslog information. The server is configured to generate a checksum for the current configuration file and determine a difference in the checksum by comparing the current configuration file with a previously generated configuration file. The server is configured to generate a difference of the current configuration file at an object level if the checksum differs by determining details of added, deleted and modified objects between the current configuration file and the previously generated configuration file. The difference is generated as a delta configuration file including the differences between the current configuration file and the previously generated configuration file. The server is configured to perform the near real-time network infrastructure synchronization by parsing the delta configuration file for various objects to generate configuration update information and patching orchestrator database with the configuration update information.

In some embodiments, the server is configured to update the orchestrator database by parsing the syslog information directly if there is no change in the network configuration of the plurality of network infrastructure devices based on the analysis of the syslog information.

In some embodiments, the server is configured to derive a current state and status of the plurality of network infrastructure devices by parsing the syslog information of the plurality of network infrastructure devices.

In some embodiments, the server is configured to update the current configuration file along with the checksum and the synchronization time in the orchestrator DB.

In some embodiments, the system includes a plurality of load balancer devices, wherein the server is further configured to manage the plurality of load balancer devices and enable searching of available objects of the configuration file and viewing of a complete hierarchy of the objects through application programming interfaces.

In some embodiments, the server is configured to monitor the syslog information of the plurality of network infrastructure devices in real-time to determine the changes in the network configuration of the plurality of network infrastructure devices.

In some embodiments, the system parses the various objects along with related parent, sibling and child objects.

In some embodiments, the server is configured to parse the delta configuration file to generate the configuration update information using a lightweight parser.

According to the second aspect of the invention, a method for performing near real-time network infrastructure synchronization using configuration differences is provided. The method includes downloading a current configuration file from a plurality of network infrastructure devices by analysing syslog information of the plurality of network infrastructure devices by a server communicatively connected with the plurality of network infrastructure devices, and determining whether there is a change in network configuration of the plurality of network infrastructure devices based on the analysis of the syslog information. The method includes generating by the server, a checksum for the current configuration file and determining a difference in the checksum by comparing the current configuration file with a previously generated configuration file. The method includes generating by the server, a difference of the current configuration file at an object level if the checksum differs by determining details of added, deleted and modified objects between the current configuration file and the previously generated configuration file. The difference is generated as a delta configuration file including the differences between the current configuration file and the previously generated configuration file. The method includes performing by the server, the near real-time network infrastructure synchronization by parsing the delta configuration file for various configuration objects and generating configuration update information, and patching orchestrator database with the configuration update information.

In some embodiments, the method further includes updating the orchestrator database by parsing the syslog information directly if there is no change in the network configuration of the plurality of network infrastructure devices based on the analysis of the syslog information.

In some embodiments, the method further includes deriving a current state and status of the plurality of network infrastructure devices by parsing the syslog information of the plurality of network infrastructure devices.

In some embodiments, the method further includes updating the current configuration file along with the checksum and the synchronization time in the orchestrator database.

In some embodiments, the method further includes managing a plurality of load balancer devices by the server and enabling (i) searching of available objects of the configuration file and (ii) viewing of a complete hierarchy of the objects through application programming interfaces.

In some embodiments, the method further includes monitoring the syslog information of the plurality of network infrastructure devices in real-time to determine the changes in the network configuration of the plurality of network infrastructure devices.

In some embodiments, the method further includes parsing the various objects along with related parent, sibling and child objects.

In some embodiments, the objects are parsed to generate the configuration update information using a lightweight parser.

According to the third aspect of the invention, a one or more non-transitory computer-readable storage mediums storing the one or more sequences of instructions, which when executed by the one or more processors, causes a method for performing near real-time network infrastructure synchronization using configuration differences. The method includes downloading a current configuration file from a plurality of network infrastructure devices by analysing syslog information of the plurality of network infrastructure devices by a server communicatively connected with the plurality of network infrastructure devices, and determining whether there is a change in network configuration of the plurality of network infrastructure devices based on the analysis of the syslog information. The method includes generating by the server, a checksum for the current configuration file and determining a difference in the checksum by comparing the current configuration file with a previously generated configuration file. The method includes generating by the server, a difference of the current configuration file at an object level if the checksum differs by determining details of added, deleted and modified objects between the current configuration file and the previously generated configuration file. The difference is generated as a delta configuration file including the differences between the current configuration file and the previously generated configuration file. The method includes performing by the server, the near real-time network infrastructure synchronization by parsing the delta configuration file for various configuration objects to generate configuration update information, and patching orchestrator database with the configuration update information.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing models are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
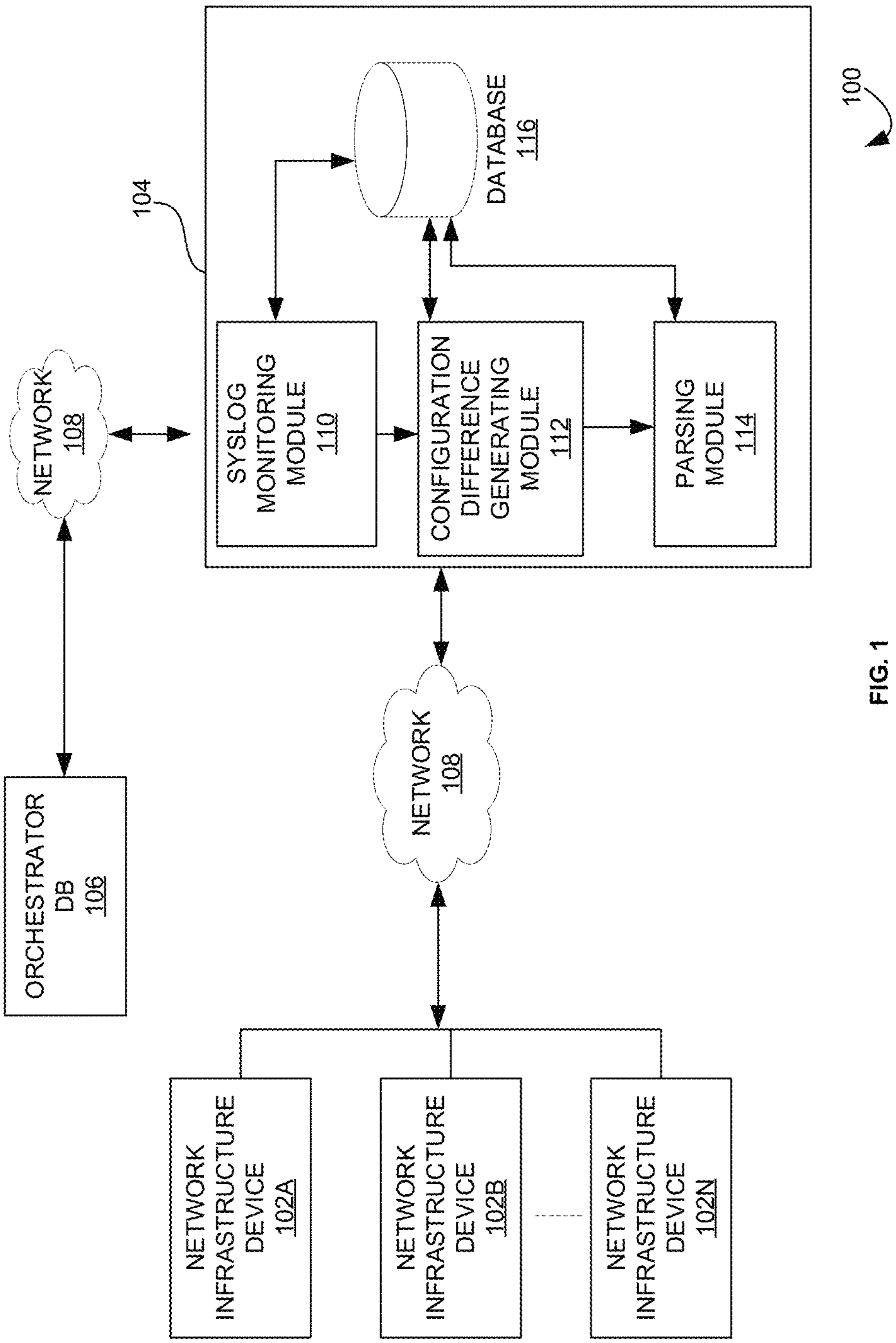
FIG. 1 is a system for performing near real-time network infrastructure synchronization using configuration differences according to some embodiments herein.

As mentioned, there remains a need for addressing the aforementioned technical drawbacks in existing technologies for performing near real-time network infrastructure synchronization using configuration differences with very minimal resource consumption at both the orchestrator as well as the network infrastructure devices. Referring now to the drawings, and more particularly to FIGS. 1 through 3, where similar reference characters denote corresponding features consistently throughout the figure's, preferred embodiments are shown.

FIG. 1 is a system for performing near real-time network infrastructure synchronization using configuration differences according to some embodiments herein. The system 100 includes a plurality of network infrastructure devices 102A-N, a server 104, an orchestrator Database (DB) 106 and a network 108. The server 104 includes a syslog monitoring module 110, a configuration difference generating module 112, and a parsing module 114. The server 104 is communicatively connected with a plurality of network infrastructure devices 102A-N through the network 108. The network 108 is a wireless network or wired network. The server 104 includes a processor and a memory comprising a database 116. The memory stores a set of instructions. The processor executes the set of instructions to perform the near real-time network infrastructure synchronization using configuration differences using the syslog monitoring module 110, the configuration difference generating module 112 and the parsing module 114 stored in the database 116.

The syslog monitoring module 110 is configured to watch for the syslog that indicates the changes in the network configuration. The configuration difference generation and the parsing are triggered when there is a change in the network configuration. Syslog makes the near real-time update possible with less resource consumption and avoids overload based on the time between two successive update triggers. The syslog from the plurality of network infrastructure devices 102A-N is monitored lively. In some embodiments, the plurality of network infrastructure devices 102A-N is configured to send the syslog for the change in state/status immediately to the server 104. The server 104 is configured to derive the current state and status of the plurality of network infrastructure devices 102A-N directly by parsing the syslog information. If the state/status message cannot be parsed 100% using the received syslog alone, the object and infrastructure device details may be derived using the received syslog and the state/status fetch may be triggered. In this way it is possible to derive the state and status information near real-time, either directly using the received syslog or by triggering the state/status object using the object and device information derived by parsing the respective syslogs.

The configuration difference generating module 112 is configured to generate the difference between two different configuration files. The previous configuration files are kept along with a checksum. In the next trigger, the latest configuration file is downloaded and if the checksum differs, the difference of the configuration file at the object level is generated. The details of added, deleted and modified objects between the two configuration files are determined. The parsing module 114 includes a lightweight parser configured to perform parsing for the various generated objects and patches in the orchestrator DB 106. The load on the orchestrator DB 106 is reduced to keep the orchestrator up-to-date with the network infrastructure. In the majority of the scenarios, a few objects are added, deleted or patched to ensure that the orchestrator DB 106 is in synchronization with the real network infrastructure since the change is minimal in a certain period.

The resource utilisation increases based on the need and the required level of update. If all the details required for updating the orchestrator DB 106 are available in the syslog, the parsing module parses the complete content from the syslog and proceeds with the update process. If the complete change information cannot be derived by the syslog information, then the configuration difference generation is triggered to understand the list of objects created, deleted and updated. Hence, a minimal configuration file is used for parsing and updating the orchestrator DB 106. The changes including the update of fields or changes in links are handled by minimal configuration file parsing and the orchestrator DB 106 is updated accordingly.

In some embodiments, the parsing is performed only with the syslog information which is very optimal and nearly 50% of the network component change scenarios are covered. Using the syslog information both the parsing and the orchestrator DB 106 updates are performed with minimal effort. If the syslog information is not complete for updating the orchestrator DB 106 with the object parsed, a complete understanding of the configuration change is required. The configuration file is downloaded and the checksum is analysed. If there is a change in the checksum, a difference is generated to determine the list of created, deleted or modified objects. The parsing is performed for the various configuration objects (not lines) along with their related (parent, sibling and child) objects minimizing the size of the configuration file for example, if the real configuration file is with the size of 500 MB, then the delta (i.e.) the difference is only few Kbs resulting in a massive saving in terms of time consumption as well as resource utilisation.

Each of the plurality network devices 102A-N has a unique configuration file. Across the plurality network devices 102A-N, the system 100 identifies the configuration change and performs delta parsing specific to the network device. This needs to be scaled on per network device basis and there is no centralised configuration involved. In some embodiments, the configuration file difference is generated at the plurality network devices 102A-N itself and hence there is no need to download the entire configuration file. The old configuration files are kept in a backup folder, the difference is generated between the old configuration file and the current configuration file, and only the difference file is downloaded. The current configuration file is regenerated using the previously backed-up configuration file at the orchestrator end. Here, the backup needs to be updated with the latest configuration file after updating the orchestrator DB 106 documents. Complete parent, child, and sibling relationships are monitored along with the field changes, including the creation, and deletion of objects ensuring that the orchestrator DB 106 is in synchronization in near real-time with the actual network infrastructure. The system 100 is utilized across various modules such as ADC+, KUBE+, CERT+, FIREWALL+, etc., to achieve near real-time network infrastructure synchronization through event-based quick delta parsing, often triggered within specific time bounds. Only the delta configuration file is taken out of the network device wherever possible. Using the delta configuration file the current configuration file is regenerated. Delta parsing is performed after the generation/retrieval of the current configuration file. Delta parsing occurs after regenerating the parsed objects based on the delta configuration, ensuring efficient delivery of the updated parsed objects. The configuration files that are not required in parsing will be ignored and only the required configuration files are transmitted out of the network device by performing the hash-based comparison on the existing configuration file tree. In some embodiments, the system 100 includes a plurality of load balancer devices like F5, Citrix, A10 etc and the server 104 is further configured to manage the plurality of load balancer devices and facilitate (i) searching of available objects of the configuration file and (ii) viewing of a complete hierarchy of the objects through application programming interfaces. In the managed load balancer devices, available objects can be searched via control center or frequent searches tab within the application. The detailed hierarchical view also can be viewed by clicking the object from the control center. Available objects of an existing configuration file are stored in the server 104. If there is a change in the configuration file, the latest configuration file's available objects are parsed (i.e.) details of created/deleted/modified object details are parsed. The server 104 is configured to update the existing object configuration when the action involves only the deletion or creation of the objects. The server 104 is configured to update the objects using the configuration difference parsing if the action involves modification of the objects. In certain scenarios where updating objects based on configuration differences is not feasible, a complete parsing of the configuration file becomes necessary. However, this situation is expected to be rare in the production load balancer environment. The database undergoes updates with minimal changes, given that objects typically synchronize quickly. Real-time change detection enables highly efficient and swift parsing of delta changes, minimizing time and resource consumption. Parsing only the delta changes swiftly brings a majority of network infrastructure devices up to date within a short period, optimizing resource usage.

Figure 2A:
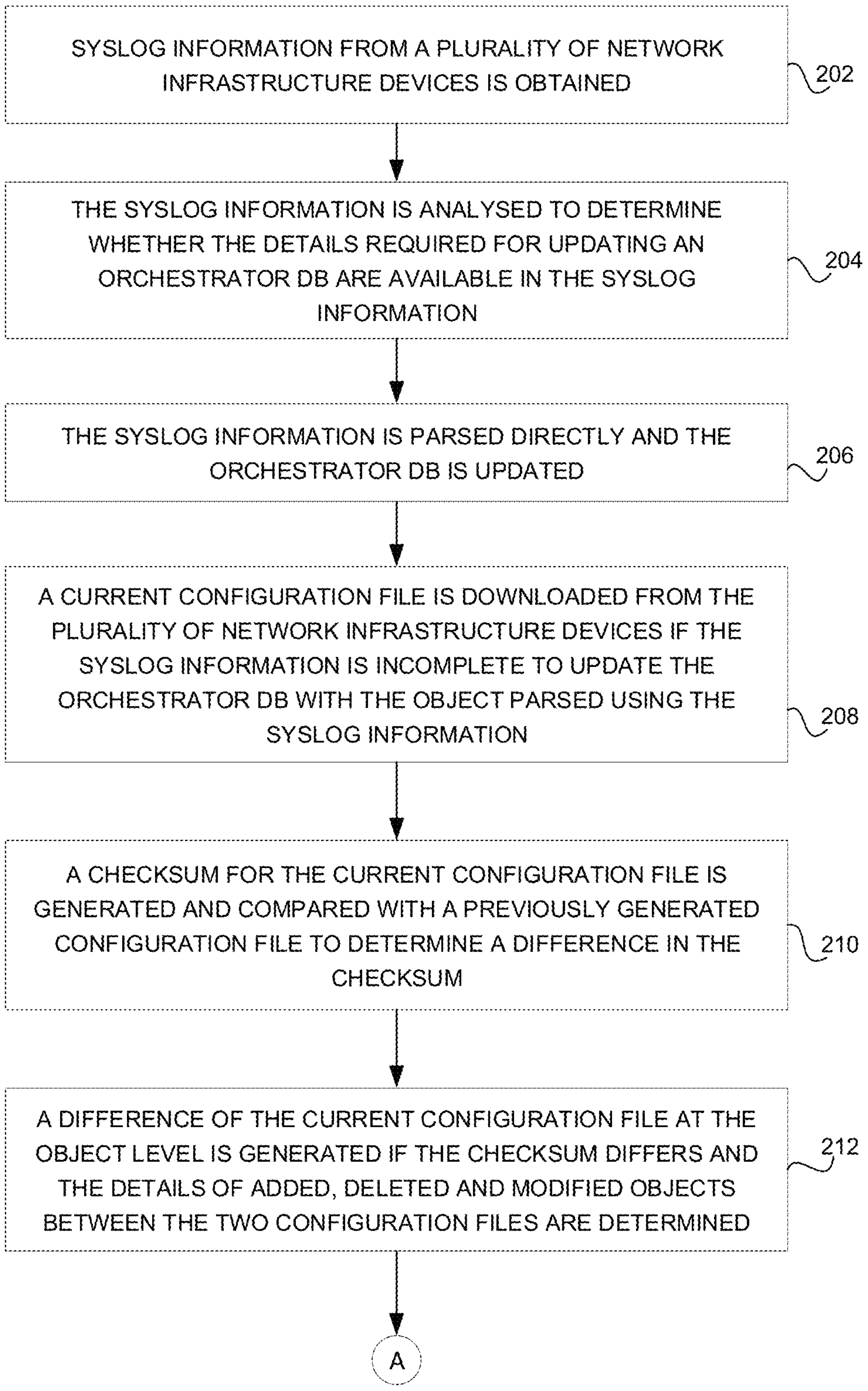
FIG. 2A-B are flow diagrams that illustrate a method for performing near real-time network infrastructure synchronization using configuration differences according to some embodiments herein.
Figure 2B:
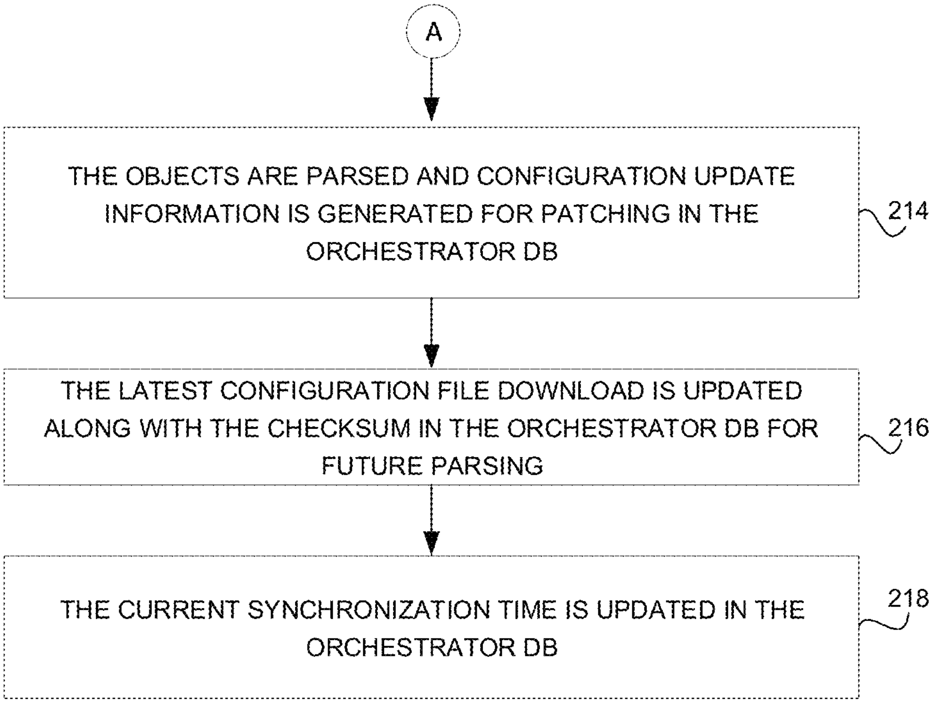
Figure 3:
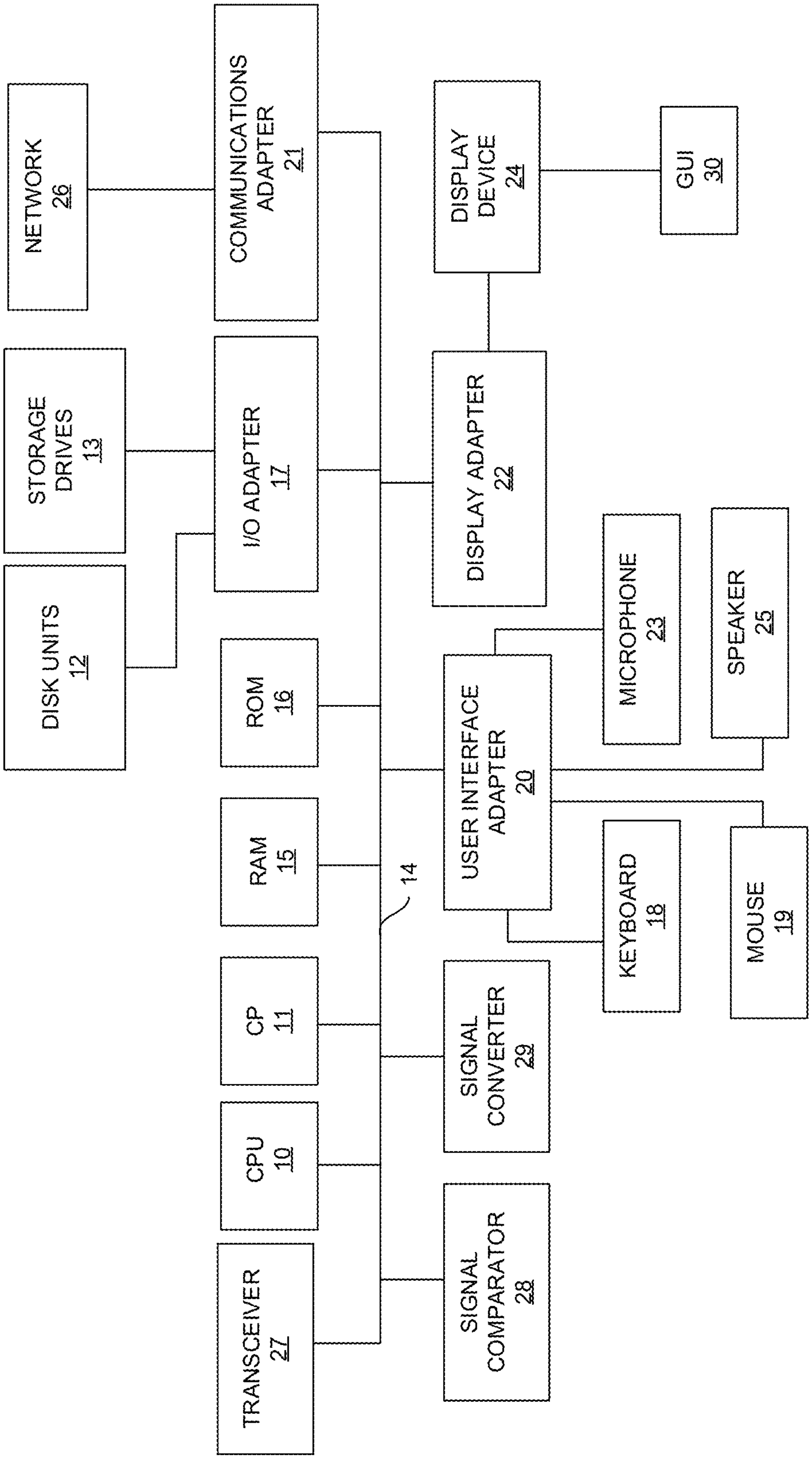
FIG. 3 is a schematic diagram of a computer architecture in accordance with the embodiments herein.

FIG. 2A-B are flow diagrams that illustrate a method for performing near real-time network infrastructure synchronization using configuration differences according to some embodiments herein.

At step 202, syslog information from a plurality of network infrastructure devices is obtained.

At step 204, the syslog information is analysed to determine whether the details required for updating an orchestrator DB are available in the syslog information.

At step 206, the syslog information is parsed directly and the orchestrator DB is updated.

At step 208, a current configuration file is downloaded from the plurality of network infrastructure devices if the syslog information is incomplete to update the orchestrator DB with the object parsed using the syslog information.

At step 210, a checksum for the current configuration file is generated and compared with a previously generated configuration file to determine a difference in the checksum.

At step 212, a difference of the current configuration file at the object level is generated if the checksum differs and details of added, deleted and modified objects between the two configuration files are determined.

At step 214, the objects are parsed and configuration update information is generated for patching in the orchestrator DB.

At step 216, the latest configuration file download is updated along with the checksum in the orchestrator DB for future parsing.

At step 218, the current synchronization time is updated in the orchestrator DB.

The method for performing near real-time network infrastructure synchronization using configuration differences is not limited to a particular layer in the network infrastructure but can be applied to any type of network devices where the configuration file parsing is involved periodically, and the representation of the configuration file needs to be generated as a whole. The method includes parsing the delta configuration file alone and augmenting the parsed objects. The resulting parsed objects after combining with the existing file will be equivalent to the parsed objects received via parsing the complete configuration file. The efficiency is achieved while parsing the configuration itself. Only the required objects are parsed with the type under delete, create and modify and only the necessary changes are patched in the DB. Downloading the configuration file from the plurality network devices is also simplified by transmitting the difference alone.

A representative hardware environment for practising the embodiments herein is depicted in FIG. 3, with reference to FIGS. 1 through 2. This schematic drawing illustrates a hardware configuration of an atypical activity detecting server 106/computer system/computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit of the appended claims.

What is claimed is:

1. A system for performing near real-time network infrastructure synchronization using configuration differences, wherein the system comprises,
- a plurality of network infrastructure devices,
- a server communicatively connected with the plurality of network infrastructure devices, wherein the server is configured to,
  - download a current configuration file from the plurality of network infrastructure devices by analysing syslog information of the plurality of network infrastructure devices, and determining whether there is a change in network configuration of the plurality of network infrastructure devices based on the analysis of the syslog information;
  - update an orchestrator database by parsing the syslog information directly if there is no change in the network configuration of the plurality of network infrastructure devices based on the analysis of the syslog information;
  - generate a checksum for the current configuration file and determine a difference in the checksum by comparing the current configuration file with a previously generated configuration file;
  - generate a difference of the current configuration file at an object level if the checksum differs by determining details of added, deleted and modified objects between the current configuration file and the previously generated configuration file, wherein the difference is generated as a delta configuration file comprising the differences between the current configuration file and the previously generated configuration file; and
  - perform the near real-time network infrastructure synchronization by parsing the delta configuration file for various objects to generate configuration update information, and patching orchestrator database with the configuration update information.

2. The system of claim 1, wherein the server is configured to derive a current state and status of the plurality of network infrastructure devices by parsing the syslog information of the plurality of network infrastructure devices.

3. The system of claim 1, wherein the server is configured to update the current configuration file along with the checksum and the synchronization time in the orchestrator database.

4. The system of claim 1, wherein the system comprises a plurality of load balancer devices, wherein the server is further configured to manage the plurality of load balancer devices and enable searching of available objects of the configuration file and viewing of a complete hierarchy of the objects through application programming interfaces.

5. The system of claim 1, wherein the server is configured to monitor the syslog information of the plurality of network infrastructure devices in real-time to determine the changes in the network configuration of the plurality of network infrastructure devices.

6. The system of claim 1, wherein the system parses the various objects along with related parent, sibling and child objects.

7. The system of claim 1, wherein the server is configured to parse the delta configuration file to generate the configuration update information using a lightweight parser.

8. A method for performing near real-time network infrastructure synchronization using configuration differences, wherein the method comprises, downloading a current configuration file from a plurality of network infrastructure devices by analysing syslog information of the plurality of network infrastructure devices by a server communicatively connected with the plurality of network infrastructure devices, and determining whether there is a change in network configuration of the plurality of network infrastructure devices based on the analysis of the syslog information;

updating the orchestrator database by parsing the syslog information directly if there is no change in the network configuration of the plurality of network infrastructure devices based on the analysis of the syslog information;

generating by the server, a checksum for the current configuration file and determining a difference in the checksum by comparing the current configuration file with a previously generated configuration file;

generating by the server, a difference of the current configuration file at an object level if the checksum differs by determining details of added, deleted and modified objects between the current configuration files and the previously generated configuration files, wherein the difference is generated as a delta configuration file comprising the differences between the current configuration file and the previously generated configuration file; and performing by the server, the near real-time network infrastructure synchronization by parsing the delta configuration file for various objects and generating a configuration update information and patching orchestrator database with the configuration update information.

9. The method of claim 8, wherein the method further comprises deriving a current state and status of the plurality of network infrastructure devices by parsing the syslog information of the plurality of network infrastructure devices.

10. The method of claim 8, wherein the method further comprises updating the current configuration file along with the checksum and the synchronization time in the orchestrator DB.

11. The method of claim 8, wherein the method further comprises managing a plurality of load balancer devices by the server and enabling (i) searching of available objects of the configuration file and (ii) viewing of a complete hierarchy of the objects through application programming interfaces.

12. The method of claim 8, wherein the method further comprises monitoring the syslog information of the plurality of network infrastructure devices in real-time to determine the changes in the network configuration of the plurality of network infrastructure devices.

13. The method of claim 8, wherein the method further comprises parsing the various objects along with related parent, sibling and child objects.

14. The method of claim 8, wherein the objects are parsed to generate the configuration update information using a lightweight parser.

15. A one or more non-transitory computer-readable storage mediums storing the one or more sequences of instructions, which when executed by the one or more processors, causes to perform a method for performing near real-time network infrastructure synchronization using configuration differences, wherein the method comprises:

downloading a current configuration file from a plurality of network infrastructure devices by analyzing syslog information of the plurality of network infrastructure devices by a server communicatively connected with the plurality of network infrastructure devices, and determining whether there is a change in network configuration of the plurality of network infrastructure devices based on an analysis of the syslog information;

generating by the server, a checksum for the current configuration file and determining a difference in the checksum by comparing the current configuration file with a previously generated configuration file;

updating the orchestrator database by parsing the syslog information directly if there is no change in the network configuration of the plurality of network infrastructure devices based on the analysis of the syslog information;

generating by the server, a difference of the current configuration file at an object level if the checksum differs by determining details of added, deleted and modified objects between the current configuration files and the previously generated configuration files, wherein the difference is generated as a delta configuration file comprising the differences between the current configuration file and the previously generated configuration file; and performing by the server, the near real-time network infrastructure synchronization by parsing the delta configuration file for various objects to generate configuration update information and patching orchestrator database with the configuration update information.

* * * * *